US009904273B2

(12) United States Patent
Ikegaya

(10) Patent No.: US 9,904,273 B2
(45) Date of Patent: Feb. 27, 2018

(54) MACHINE TOOL AND INTERPRETIVE PROGRAM

(71) Applicant: STAR MICRONICS CO., LTD., Shizuoka (JP)

(72) Inventor: Takeshi Ikegaya, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 329 days.

(21) Appl. No.: 14/615,511

(22) Filed: Feb. 6, 2015

(65) Prior Publication Data

US 2015/0309501 A1 Oct. 29, 2015

(30) Foreign Application Priority Data

Apr. 24, 2014 (JP) ................. 2014-090357

(51) Int. Cl.
*G05B 19/4061* (2006.01)

(52) U.S. Cl.
CPC ............ *G05B 19/4061* (2013.01); *G05B 2219/35306* (2013.01); *G05B 2219/49157* (2013.01)

(58) Field of Classification Search
CPC ...... G05B 19/4061; G05B 2219/35306; G05B 2219/49157
USPC ........................................................ 700/186
See application file for complete search history.

(56) References Cited

U.S. PATENT DOCUMENTS 6,741,905 B1 *  5/2004  Fishman .......... G05B 19/40937
                                                         142/3
7,832,968 B2 * 11/2010  Glaesser .................. B23C 3/18
                                                       409/132

2001/0048857 A1 * 12/2001 Koch ................. G05B 19/4061
                                                        409/132
2006/0271233 A1 * 11/2006 Liang ............... G05B 19/40938
                                                        700/178
2011/0158775 A1 *  6/2011 Ando ....................... B23B 3/36
                                                       414/222.07
2012/0221137 A1    8/2012 Kettemer
2012/0239182 A1    9/2012 Kikata
2013/0041498 A1    2/2013 Nakamura
2013/0253695 A1    9/2013 Iuchi

FOREIGN PATENT DOCUMENTS

JP          3116129         2/1997

OTHER PUBLICATIONS

The Extended European Search Report, European Patent Office, dated Oct. 1, 2015, European Patent Application No. 15154957.3.

* cited by examiner

*Primary Examiner* — Ziaul Karim
*Assistant Examiner* — Joshua Sanders
(74) *Attorney, Agent, or Firm* — LEX IP MEISTER, PLLC

(57) ABSTRACT

A machine tool includes a tool post having a tool unit for machining a workpiece, operation control means for controlling the operation of the tool unit in accordance with a plurality of commands described in a numerical control program and movement limiting means for inhibiting entry of the tool unit into a no-entry region. The plurality of commands include a limit value setting command for calculating a limit value of a position of the tool unit avoiding interference with a machine element located within a movable region of the tool unit and for determining the no-entry region by the calculated limit value. Upon reading the limit value setting command out of the numerical control program, the operation control means calculates the limit value and determines the no-entry region by the calculated limit value.

4 Claims, 13 Drawing Sheets

FIG. 7

M131 command

Path 1
  X command: movement in X1-axis direction
  Y command: movement in Y1-axis direction
  Z command: movement in Z1-axis direction
  C command: movement in C1-axis direction Path 2
  X command: movement in X2-axis direction
  Y command: movement in Y2-axis direction
  Z command: movement in Z2-axis direction
  C command: movement in C2-axis direction Path 3
  X command: movement in X3-axis direction
  Y command: movement in Y3-axis direction
  Z command: movement in Z3-axis direction
  C command: invalid M133 command Path 1
  X command: movement in X1-axis direction
  Y command: movement in Y1-axis direction
  Z command: invalid
  C command: invalid Path 2
  X command: movement in X2-axis direction
  Y command: movement in Y2-axis direction
  Z command: movement in Z2-axis direction
  C command: movement in C2-axis direction Path 3
  X command: movement in X3-axis direction
  Y command: movement in Y3-axis direction
  Z command: movement in Z1-axis direction
  C command: movement in C1-axis direction
  Z3 command: movement in Z3-axis direction

MACHINE TOOL AND INTERPRETIVE PROGRAM

CROSS-REFERENCE TO RELATED APPLICATIONS

This application claims priority to Japan Patent Application No. 2014-090357 filed on Apr. 24, 2014, and all the benefits accruing therefrom under 35 U.S.C. § 119, the content of which in its entirety is herein incorporated by reference.

BACKGROUND

1. Field

The present invention relates to a machine tool including a tool post having a tool unit that machines a workpiece and an interpretive program for the machine tool.

2. Description of the Related Art

Examples of such a machine tool include a numerical control (NC) lathe that executes a numerical control (NC) program stored in an internal storage unit to machine a workpiece. One of such NC lathes is a spindle movable NC lathe having a guide bush disposed between a main spindle and a sub spindle (an opposing spindle). For example, in the spindle movable NC lathe, a workpiece chucked by the main spindle and supported by the guide bush is machined using a front machining tool mounted on the tool post, and then machined using a backworking tool mounted on the tool post. The tool is mounted on a tool unit attached to the tool post.

Japanese Patent No. 3116129 describes a machining method for use in an NC machine tool to machine a workpiece using 5-axis horizontal machining centers. In the machining method, a machined curved surface is virtually inclined at an average inclination angle θ in a CAD/CAM device, and calculation is performed to examine interference between a workpiece and a tool system. A NC machining program is developed after the interference check.

SUMMARY OF THE INVENTION

An NC programmer is requested to check interference between a tool unit and another machine element in developing the NC program. However, an interference check in each step of the NC program is so hard if a workpiece is to be machined using a front machining tool of the tool unit pivotably attached to a turret tool post that is movable in the axis direction of the workpiece.

In the above-described case, when the position of the turret tool post in the axis direction of the workpiece is within a predetermined range relative to the guide bush, the pivotable range of the tool unit can be limited to a range between a minus 90-degree angle (−90°) to a plus 90-degree angle (+90°) that is not on a guide bush side. However, if the pivotable range is limited to a certain range, the workpiece cannot be machined at a pivotable position smaller than a minus 90–degree angle (−90°) or larger than a plus 90-degree angle (+90°) even if the tool unit is within the range that does not interfere with the guide bush.

In Addition, in the above-described case, a three-dimensional (3D) interference checking function can be provided to an NC apparatus. The 3D interference checking function is intended to provide the 3D data of simple shapes, such as a cylinder and a cuboid, to the guide bush and the tool unit and determine whether interference between the guide bush and the tool unit occurs during execution of the NC program on the basis of the 3D data. However, if the 3D interference checking function is provided to the NC apparatus, the cost of the machine tool increases.

Note that in the machining method described in Japanese Patent No. 3116129, only the occurrence of interference between a workpiece and a tool system is checked. The occurrence of interference between the tool unit attached on the tool post and another machine element is not checked. In addition, in the machining method described in Japanese Patent No. 3116129, the interference check is performed before an NC machining program is developed. The interference check is not performed during execution of the NC machining program.

The above-described problems arise in not only NC lathes having a pivotable tool unit attached to a turret tool post but also a variety of machine tools.

Accordingly, the present invention provides a technology that allows the tool unit to move to the nearly limit value while avoiding interference with another machine element without using costly interference checking.

According to an aspect of the present invention, a machine tool includes a tool post having a tool unit for machining a workpiece attached thereto, operation control means for controlling an operation of the tool unit in accordance with a plurality of commands described in a numerical control program, and movement restricting means for inhibiting entry of the tool unit into a no-entry region. The plurality of commands include a limit value setting command for calculating a limit value of a position of the tool unit avoiding interference with a machine element located within a movable region of the tool unit and determining the no-entry region by the calculated limit value. Upon reading the limit value setting command out of the numerical control program, the operation control means calculates the limit value and determines the no-entry region by the calculated limit values.

Furthermore, the present invention is applicable to, for example, an interpretive program that causes a computer to execute each of the functions performed by the operation control means and the movement restricting means, a non-transitory computer-readable medium storing the interpretive program, and an interpreting and executing method including steps corresponding to the above-described means.

According to the present invention, the tool unit is allowed to move to the nearly limit value while avoiding interference with another machine element without costly interference checking. In addition, the tool unit is allowed to move to the nearly limit value when the tool post is movably provided relative to another machine element. Furthermore, the tool unit is allowed to move to the nearly limit value using a small amount of memory area.

BRIEF DESCRIPTION OF THE DRAWINGS

FIG. 7 is a schematic illustration of an example of the structures of a spindle designating command and a spindle designation cancel command.

DESCRIPTION OF THE PREFERRED EMBODIMENTS

Exemplary embodiments of the present invention are described below. It should be noted that the following embodiments are merely for illustrative purposes only, and all the features of the embodiments are not essential to the solving means of the invention.

(1) OUTLINE OF TECHNOLOGY INCLUDED IN INVENTION

Figure 1:
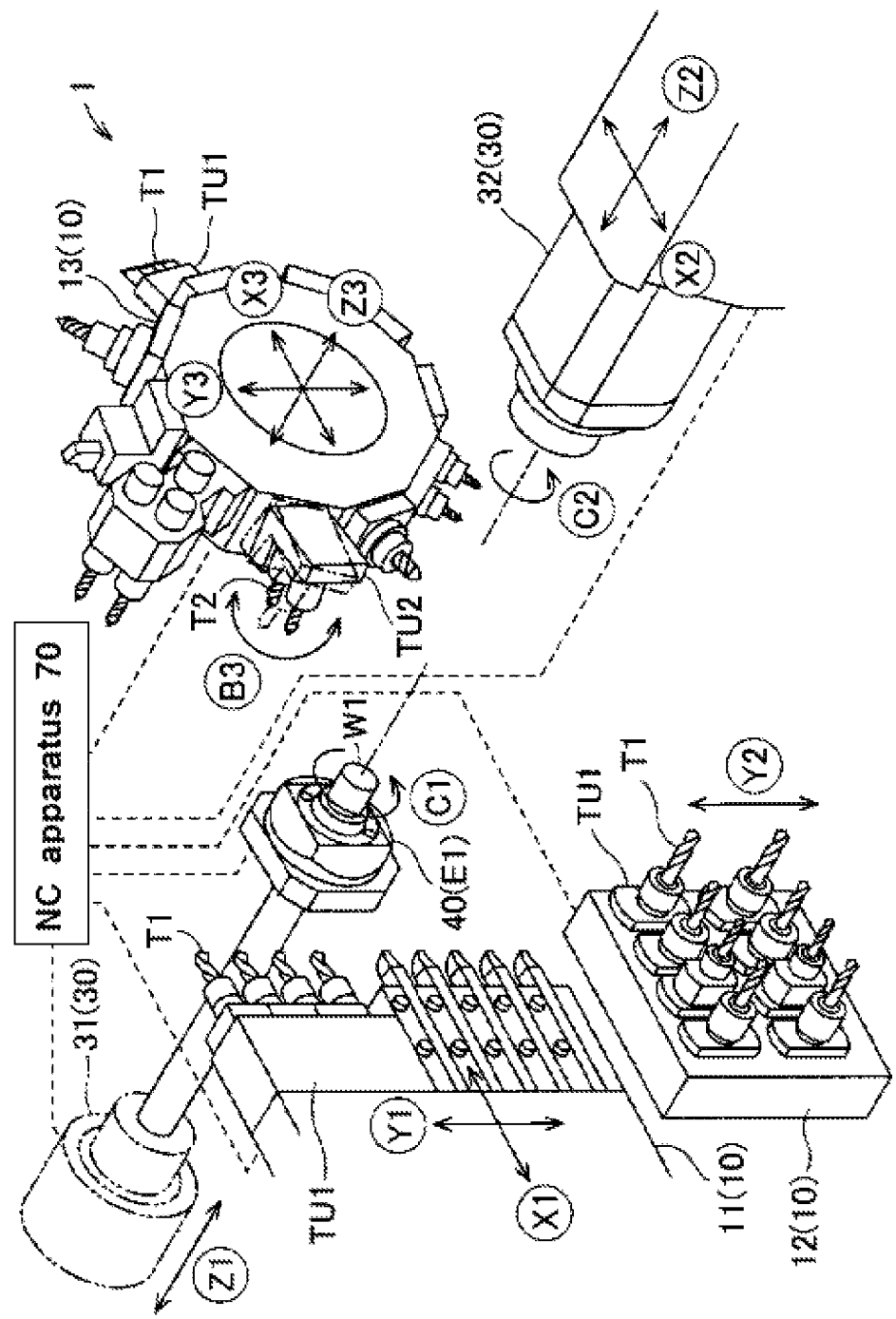
FIG. 1 is a schematic illustration of an example of a machine tool.

The outline of the technology included in the present invention is described first with reference to FIGS. 1 to 10. In FIG. 1 and the subsequent drawings, a numerical control (NC) lathe 1 is illustrated as an example of the machine tool. Note that FIGS. 1 to 10 are schematic illustrations and, thus, the figures may not be comparable with one another.

According to the present technology, the machine tool includes a tool post 10 having a tool unit TU1 that machines a workpiece W1, operation control means U1 for controlling the operation of the tool unit TU1 in accordance with a plurality of commands CM1 described in a numerical control (NC) program P2, and movement restricting means U2 for inhibiting entry of the tool unit TU1 into a no-entry region A1. The plurality of commands CM1 include a limit value setting command CM2 (e.g., an M168 command illustrated in FIG. 9). The limit value setting command CM2 is used to calculate limit values LM1 of the position of the tool unit TU1 avoiding interference with a machine element E1 (e.g., a guide bush 40) located within a movable region of the tool unit TU1 and then determine the no-entry region A1 by the calculated limit values LM1. Upon reading the limit value setting command CM2 out of the numerical control (NC) program P2, the operation control means U1 calculates the limit values LM1 and determines the no-entry region A1 by the calculated limit values LM1 as illustrated in FIG. 10.

In addition, according to the present technology, an interpretive program for use in a machine tool including the tool post 10 having the tool unit TU1 that machines the workpiece W1 is provided. The interpretive program causes a computer to execute an operation control function for controlling the operation of the tool unit TU1 in accordance with a plurality of commands CM1 described in the NC program P2 and a movement restricting function for inhibiting entry of the tool unit TU1 into the no-entry region A1. When the limit value setting command CM2 is read out of the NC program P2, the limit values LM1 are calculated and the no-entry region A1 is determined by the calculated limit values LM1.

Figure 4A:
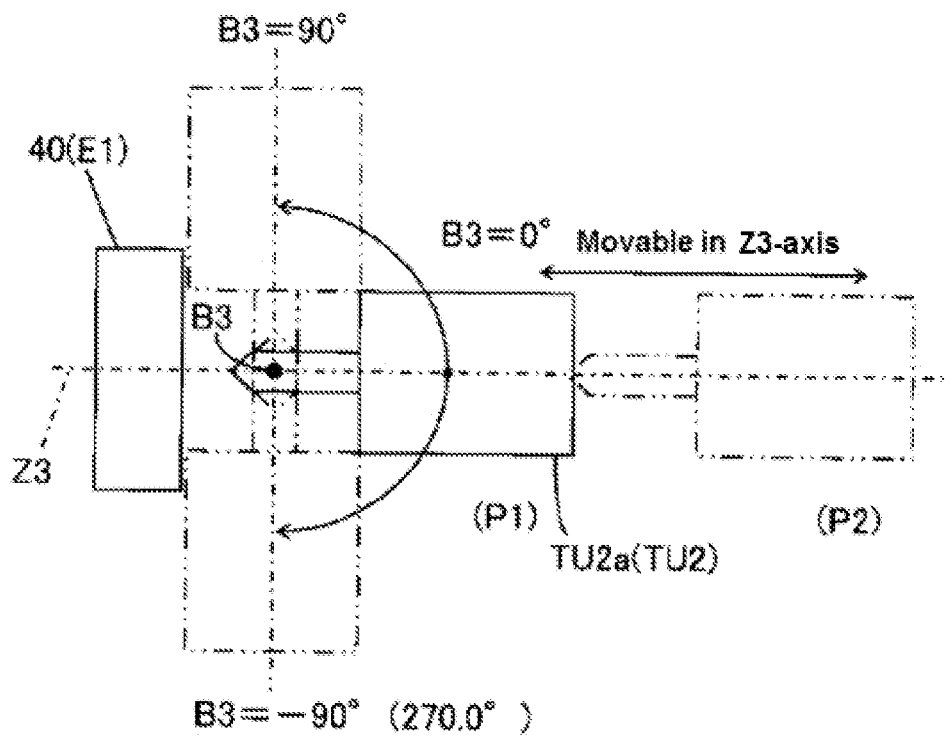
FIG. 4A and FIG. 4B are schematic illustrations of an example of the operation of the pivoting unit.

It is assumed that the turret is movable in a Z3-axis direction and a pivoting portion TU2a of a tool unit (TU2) attached to the turret is pivotable on a B3-axis, as illustrated in FIG. 4A. If the tool unit (TU2) is brought close to the guide bush 40 and the pivoting portion TU2a turns greater than 90 degrees (90°), the tool unit (TU2) could interfere with the guide bush 40 without the limit value setting command CM2. An interference check in each step of the program would be very hard for a programmer. It is then assumed that movement of the pivoting portion TU2a is restricted to the range from a minus 90-degree angle (−90°) to a plus 90-degree angle (+90°) when the Z3-axis position of the turret is within a predetermined range relative to the guide bush 40 so that the pivoting portion TU2a is not allowed to enter the guide bush side beyond the range. In such a case, however, the workpiece W1 could not be machined at a pivoting position smaller than a minus 90-degree angle (−90°) or greater than a plus 90-degree angle (+90°) due to the restriction even when the tool unit is in a position pivotable without interference with the guide bush 40. In addition, if the 3D interference checking function is provided in the NC apparatus, the cost of the machine tool would be significantly increased.

In contrast, according to the present technology, when the limit value setting command CM2 is read out of the NC program P2, the limit values LM1 of the position of the tool unit TU1 avoiding interference with the machine element E1 are calculated and then the no-entry region A1 is determined accordingly. Entry of the tool unit TU1 into the no-entry region A1 is inhibited. Thus, according to the present technology, the tool unit can be moved to the nearly limit value while avoiding interference with another machine element without using costly interference checking.

Note that examples of the tool post includes the turret tool post and a gang tool post. The concept of the tool post 10 as illustrated in FIG. 1 and the subsequent figures include a gang tool post 11, a backworking tool post 12, and the turret 13. At least part of the tool unit may be movably attached to the tool post or may be unmovably fixed to the tool post. At least part of the tool unit may be pivotable with respect to the tool post. The tool post having a movable tool unit mounted thereon may be movably provided relative to another machine element or unmovably fixed to another machine element. If the tool post is movably provided with respect to another machine element, the tool unit mounted on the tool post may be also movably provided with respect to another machine element in such a manner that the tool post is close to or separate from another machine element.

Examples of the machine element include a guide bush that supports a workpiece in a slidable manner in the axis direction of the workpiece and a main spindle that releasably chucks the workpiece. The concept of a spindle 30 as illustrated in FIG. 1 and the subsequent figures includes a main spindle 31 and a sub spindle (an opposing spindle) 32.

The limit values include the limit values of the pivoting position, the X-axis position (the position in the X-axis direction), the Y-axis position (the position in the Y-axis direction), and the Z-axis position (the position in the Z-axis direction) of the tool unit. Note that the term "X-axis direction" collectively refers to an X1-axis direction, an X2-axis direction, and an X3-axis direction. The term "Y-axis direction" collectively refers to a Y1-axis direction, a Y2-axis direction, and a Y3-axis direction. The term "Z-axis direction" collectively refers to a Z1-axis direction, a Z2-axis direction, and a Z3-axis direction.

If the tool post 10 is movably provided relative to the machine element E1, the operation control means U1 may calculate the limit values LM1 on the basis of the position of the tool post 10 (e.g., the position in the Z3-axis direction)

when the limit value setting command CM2 is read out of the NC program P2. In such a case, the no-entry region A1 is determined by the limit values LM1 calculated on the basis of the position of the tool post 10. Thus, the present exemplary embodiment is suitable for moving the tool unit to the nearly limit value when the tool post is movable relative to another machine element.

Figure 3:
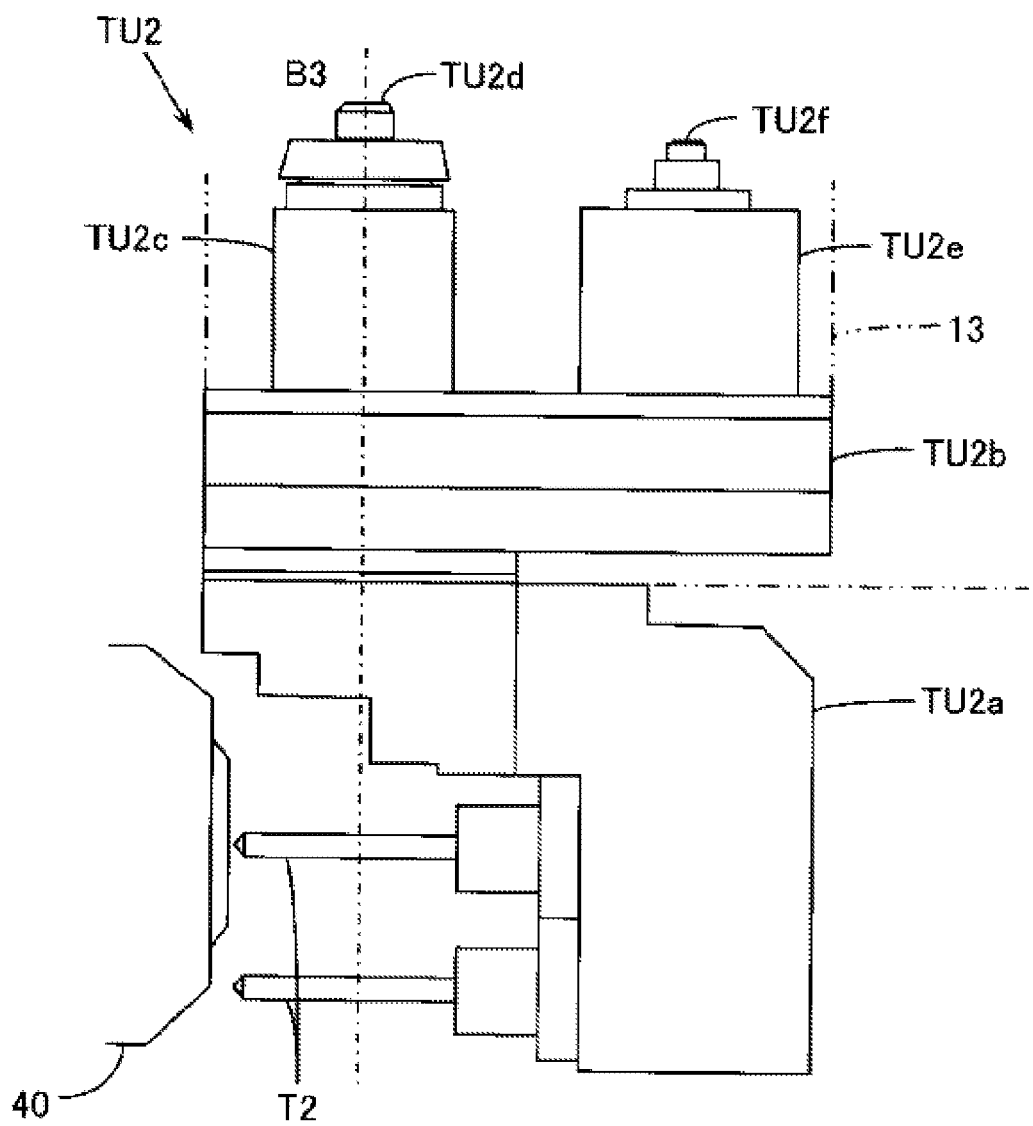
FIG. 3 illustrates an example of a pivoting unit.

When at least part of the tool unit is pivotable with respect to the tool post 10, the operation control means U1 may calculate the limit values LM1 of the pivoting position of the tool unit (TU2) (e.g., "B3−" and "B3+" illustrated in FIG. 10) avoiding interference with the machine element E1 when the limit value setting command CM2 is read out of the NC program P2. In such a case, the no-entry region A1 is determined by the calculated limit values LM1 of the pivoting position of the tool unit (TU2). Note that the concept of the pivoting position of the tool unit includes the pivoting position of the pivoting portion TU2a as illustrated in FIG. 3.

If the Z-axis position of the turret 13 is finely controlled, the limit values of the pivoting angle of the tool unit (TU2) avoiding interference with the machine element E1 would be finely varied. If the limit values are stored in an information table for each of the Z-axis positions of the turret 13, a large amount of memory area would be required and, thus, the cost of the machine tool would be increased. In contrast, according to the present exemplary embodiment of the present technology, since the limit values LM1 of the pivoting angle is calculated to determine the no-entry region A1, the tool unit is pivotable to the nearly limit value using a small amount of memory area. Note that according to the present exemplary embodiment, only part of the tool unit (e.g., the pivoting portion TU2a illustrated in FIG. 3) may be pivotable. Alternatively, the whole tool unit may be pivotable.

The machine tool may include the spindle 30 that is movable in the axis direction thereof (the Z-axis direction) and that releasably chucks the workpiece W1 inserted in the Z-axis direction and the guide bush 40 that slidably supports the workpiece W1 chucked by the spindle 30. The machine element E1 may be the guide bush 40. Upon reading the limit value setting command CM2 out of the NC program P2, the operation control means U1 may calculate the limit values LM1 of the position of the tool unit TU1 avoiding interference with the guide bush 40 and determine the no-entry region A1 by the calculated limit values LM1. That is, upon reading a limit value setting command, the limit values LM1 of the position of the tool unit TU1 that prevent the occurrence of interference with the guide bush are calculated to determine the no-entry region A1. According to the present exemplary embodiment, since setting of the limit values can be changed with a simplified operation, the present exemplary embodiment is suitable for a spindle movable type lathe.

Figure 8:
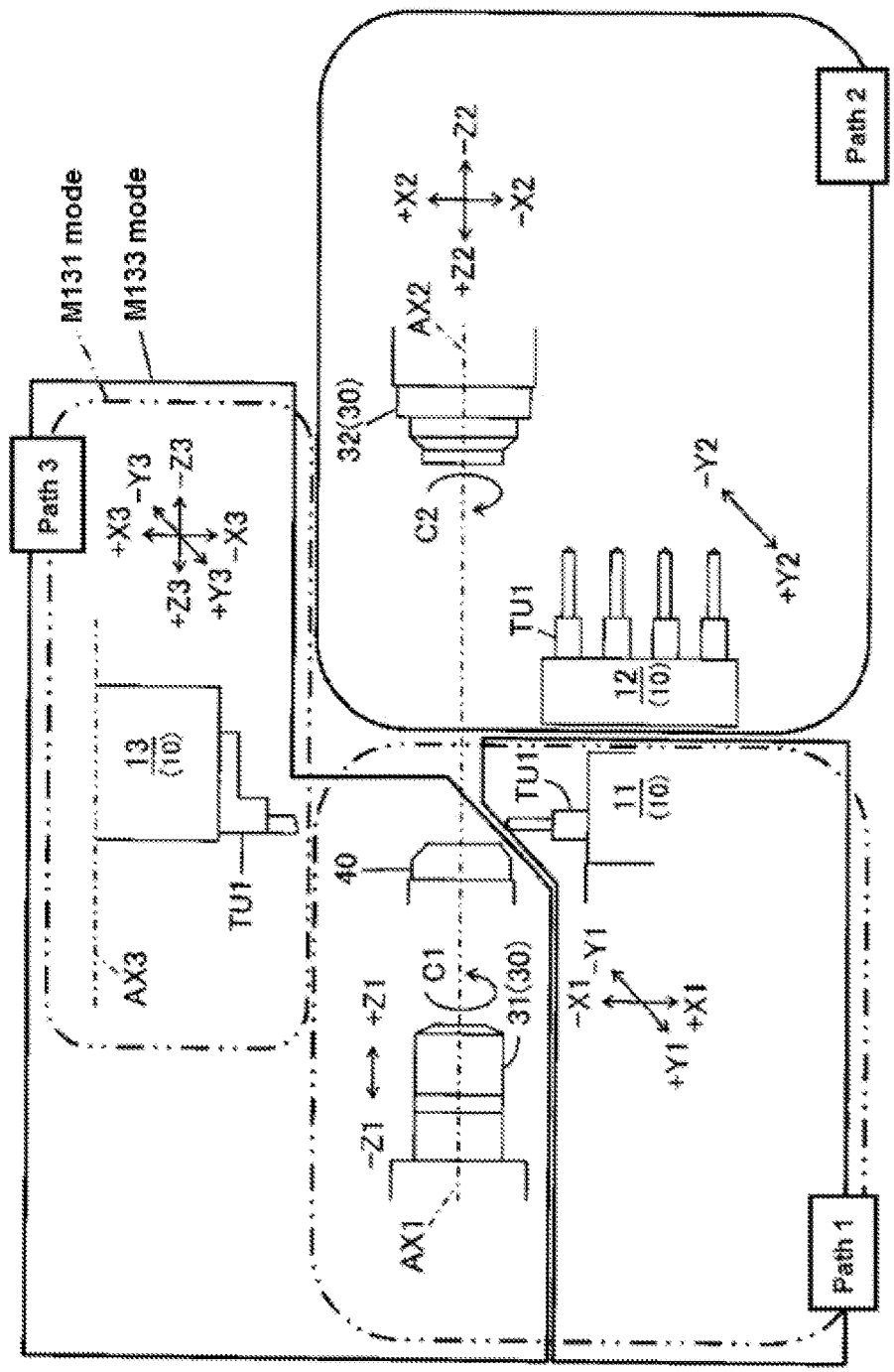
FIG. 8 is a schematic illustration of an example of paths of the spindle designating command and the spindle designation cancel command.
Figure 9:
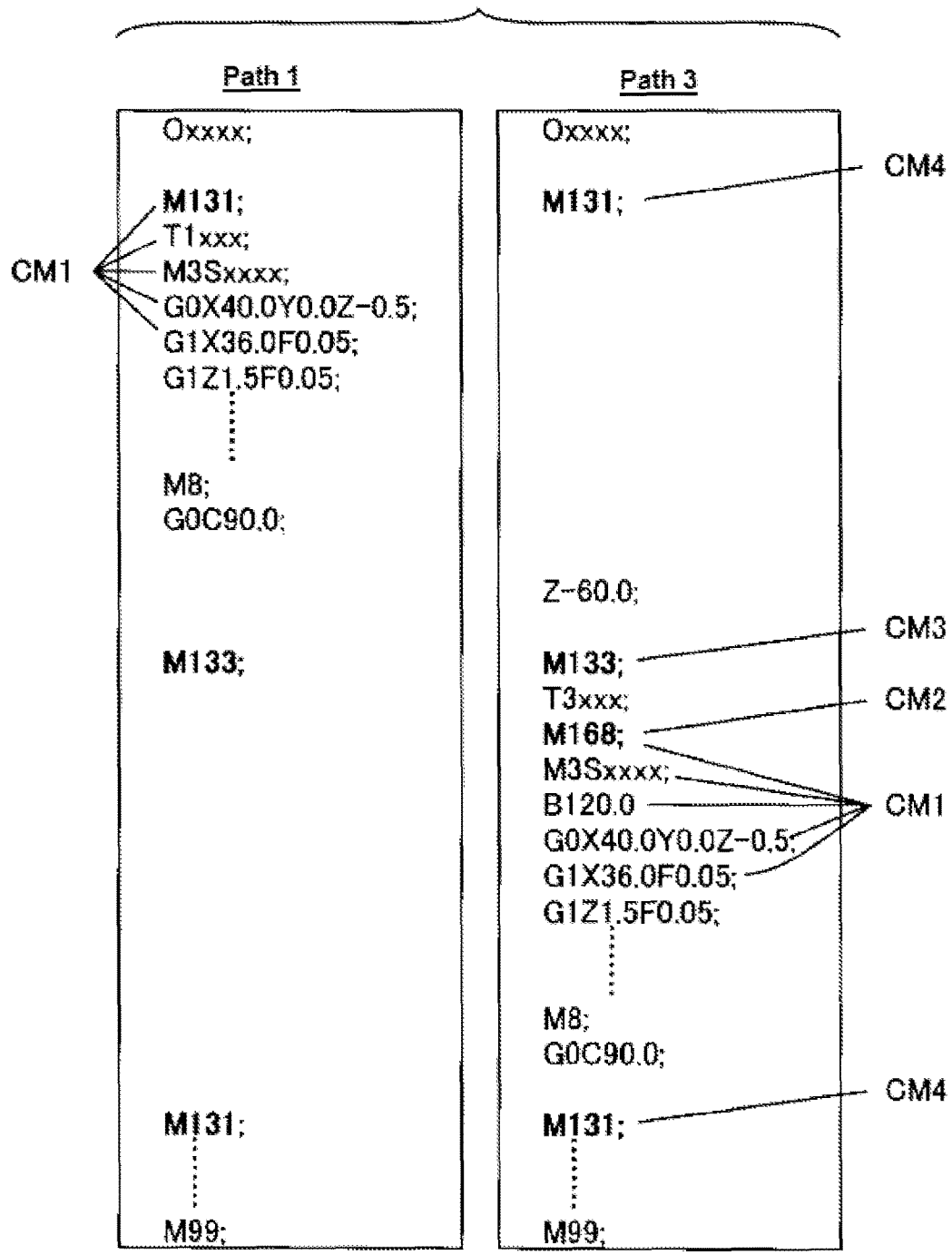
FIG. 9 is a schematic illustration of an example of a numerical control program describing a plurality of commands for each of the paths.
Figure 10:
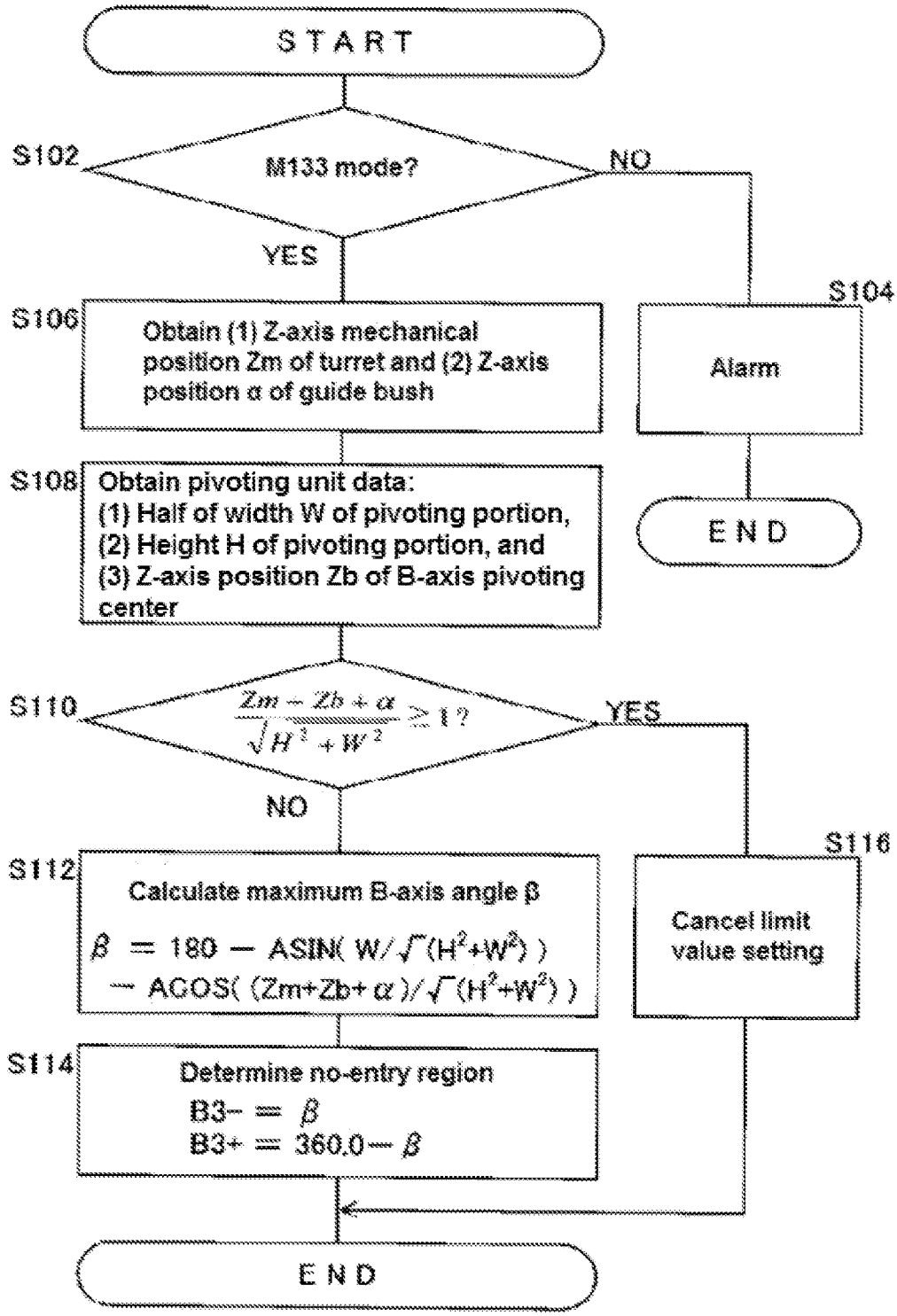
FIG. 10 is a flowchart illustrating an example of a processing when a limit value setting command is executed.

The plurality of the commands CM1 may include a spindle designating command CM3 (e.g., an M133 command illustrated in FIG. 9). The spindle designating command CM3 may be used to designate the spindle 30 as a command target for the movement in the Z-axis direction in a predetermined path including the tool post 10 (e.g., a path 3 illustrated in FIG. 8). The plurality of the commands CM1 may include a spindle designation cancel command CM4 used to cancel the designation made by the spindle designating command CM3. Upon reading the limit value setting command CM2 out of the NC program P2, the operation control means U1 may calculate the limit values LM1 to determine the no-entry region A1 when the spindle 30 is designated as the command target for the movement in the Z-axis direction in the predetermined path (the path 3). When the designation made by the spindle designating command CM3 is canceled, however, the operation control means U1 may restrict the movement of the tool unit TU1. When the spindle 30 is designated as the command target for the movement in the Z-axis direction in the predetermined path (the path 3), the tool post 10 and the tool unit TU1 are not allowed to move in the axis direction (the Z3-axis direction) by the command in the predetermined path (the path 3). The no-entry region A1 may be determined by the limit values LM1 of the tool unit TU1 and appropriately maintained until the limit values LM1 are reset. If the designation made by the spindle designating command is canceled, however, the tool post 10 and the tool unit TU1 is allowed to be moved in the axis direction (the Z3-axis direction) by the command in the predetermined path. If the tool unit TU1 is brought in the axis direction closer to the machine element E1, there occurs a risk of interference with the machine element E1. Accordingly, by restricting the movement of the tool unit TU1, interference between the tool unit TU1 and the machine element E1 can be avoided. Thus, the present exemplary embodiment can provide a suitable spindle movable type lathe that can avoid interference between the tool unit and another machine element.

(2) EMBODIMENT OF THE INVENTION

FIG. 1 is a schematic illustration of the NC lathe 1, which is a particular example of the machine tool according to the present exemplary embodiment. The NC lathe 1 includes a plurality of the spindles 30 (the main spindle 31 and the sub spindle 32), the guide bush 40, a plurality of the tool posts 10 (the gang tool post 11, the backworking tool post 12, and the turret 13), and the NC apparatus 70.

The workpiece W1 is a cylindrical bar material. The workpiece W1 inserted in the Z1-axis direction is releasably chucked by the main spindle 31 to be rotated in a C1-axis direction on a rotation axis AX1 that extends in the length direction of the workpiece W1 (refer to FIG. 8). The main spindle 31 is mounted on a headstock table (not illustrated) to be movable in the Z1-axis direction (the axis direction of the main spindle 31). The workpiece W1 chucked by the main spindle 31 is slidably supported by the guide bush 40 in the Z1-axis direction. The guide bush 40 is driven to be rotated in the C1-axis direction in synchronization with the main spindle 31. After the front machining is finished, the workpiece W1 inserted in the Z2-axis direction is releasably chucked by the sub spindle 32 to be rotated in a C2-axis direction on a rotation axis AX2 that extends along the rotation axis AX1 (refer to FIG. 8). The sub spindle 32 is mounted on a sub spindle table (not illustrated) to be movable in the Z2-axis direction (the axis direction of the sub spindle 32) and the X2-axis direction.

The workpiece W1 is machined by the tool unit TU1 attached to the tool post. The tool unit TU1 has a tool T1 mounted thereon. The tool T1 may be a rotary tool such as a rotary drill and may be a stationary tool. The tool unit TU1 may be fixed or may be pivotable on a predetermined axis (the B3-axis in FIG. 1) with respect to the tool post 10. The pivoting tool unit TU2 is also referred to a "pivoting unit". In FIG. 1 and the subsequent figures, a tool mounted on a pivoting unit is identified by a reference symbol "T2".

The gang tool post 11 is configured to machine the front and back of the workpiece W1. A plurality of the tools T1 are arranged in a direction (the Y1-axis direction in FIG. 1) perpendicular to the Z1-axis direction. The gang tool post 11 is mounted on a gang tool post table (not illustrated) to be movable in the X1-axis direction and the Y1-axis direction. The backworking tool post 12 is configured to machine the back surface of the workpiece W1. A plurality of the tools T1 are arranged in a direction perpendicular to the Z2-axis direction. The backworking tool post 12 is mounted on a backworking tool post table (not illustrated) to be movable in the Y2-axis direction. The turret 13 is configured to machine the front and the back of the workpiece W1. The turret 13 has a plurality of the tool units TU1 radially attached around an indexing axis AX3 (refer to FIG. 8). The turret 13 is mounted on a turret table (not illustrated) to be rotatable on the indexing axis AX3 and movable in the X3-axis direction, the Y3-axis direction, and the Z3-axis direction. Accordingly, the turret 13 is configured to be movable relative to the guide bush 40, which is the machine element E1.

Note that the X1-, X2-, and X3-axis directions are the same direction along a control axis called "X-axis". The Y1-, Y2-, and Y3-axis directions are the same direction along a control axis called "Y-axis". The Z1-, Z2-, and Z3-axis directions are the same direction along a control axis called "Z-axis". The X-axis, Y-axis, and Z-axis are perpendicular to one another. The NC apparatus 70 controls the operations performed by the elements of the NC lathe 1, that is, the main spindle 31, the guide bush 40, the sub spindle 32, the gang tool post 11, the backworking tool post 12, and the turret 13.

Figure 2:
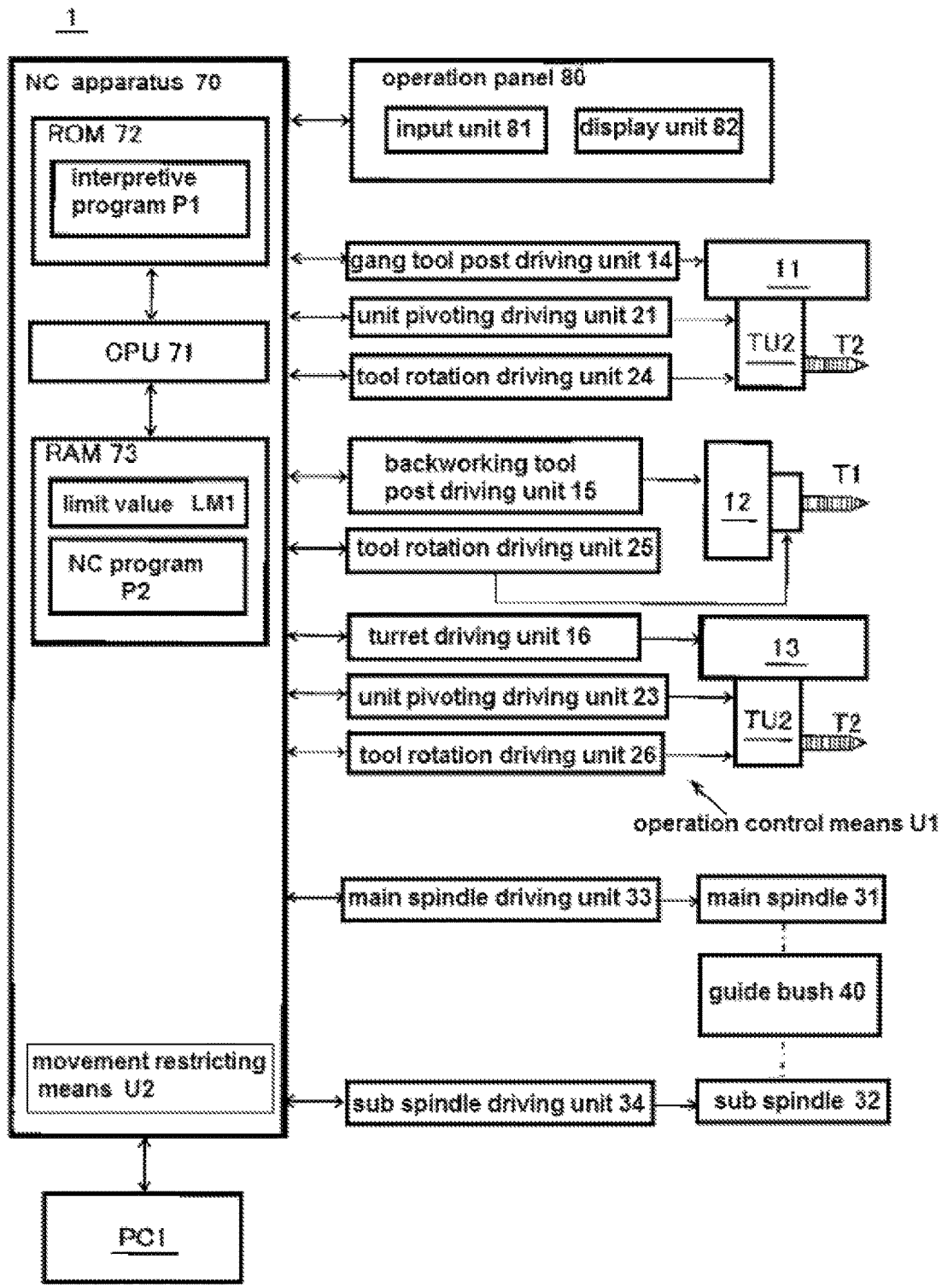
FIG. 2 is a block diagram schematically illustrating an example of an electrical circuit configuration of the machine tool.

As illustrated in FIG. 2, in the NC lathe 1, the NC apparatus 70 is connected to, for example, an operation panel 80, tool post driving units 14 to 16, unit pivoting driving units 21 and 23, tool rotation driving units 24 to 26, and spindle driving units 33 and 34. The NC apparatus 70 is a computer including a central processing unit (CPU) 71 connected to semiconductor memories such as a read only memory (ROM) 72 and random access memory (RAM) 73, a timer circuit (not illustrated), and an interface (I/F). An interpretive program P1 is stored in the ROM 72 and the limit values LM1 and the NC program P2 are stored in the RAM 73, which are being described in detail below.

The operation panel 80 includes an input unit 81 and a display unit 82. The operation panel 80 serves as a user interface of the NC apparatus 70. The input unit 81 includes buttons and a touch panel used to receive operation inputs from an operator. The display unit 82 is configured to display information received through the input unit 81 and other information regarding the NC lathe 1. The operator can store the NC program P2 in the RAM 73 using the operation panel 80 or an external computer PC1.

The gang tool post driving unit 14 is configured to move the gang tool post 11 in the X1 direction and Y1 direction under control of the NC apparatus 70. The unit pivoting driving unit 21 is configured to pivot a pivoting portion of the pivoting unit TU2 attached to the gang tool post 11 under control of the NC apparatus 70. The tool rotation driving unit 24 drives a rotary tool of the tool unit TU1 or the pivoting tool unit TU2. A particular example of the machine tool including a gang tool post having a pivoting unit attached thereto is described below.

The backworking tool post driving unit 15 is configured to move the backworking tool post 12 in the Y2 direction under control of the NC apparatus 70. The tool rotation driving unit 25 is configured to drive the rotary tool attached to the backworking tool post 12.

The turret driving unit 16 is configured to rotate the turret 13 or move the turret 13 in the X3 direction, Y3 direction, and Z3 direction under control of the NC apparatus 70. The unit pivoting driving unit 23 is configured to pivot the pivoting portion TU2a of the pivoting unit TU2 (FIG. 3) attached to the turret 13 on the B3 axis under control of the NC apparatus 70. Rotation driving force from a unit pivoting driving shaft, which is coaxially arranged with an indexing driving shaft for indexing the position of the turret 13, may be transmitted to a pivoting shaft TU2d (FIG. 3) of the pivoting unit TU2 to pivot the pivoting portion TU2a. The tool rotation driving unit 26 is configured to drive the rotary tool of the tool unit TU1 or the pivoting unit TU2. Rotation driving force from a tool rotation driving shaft, which is coaxially arranged with the indexing driving shaft for indexing the position of the turret 13, may be transmitted to a rotation shaft TU2f (FIG. 3) of the pivoting unit TU2 to drive the rotary tool.

The main spindle driving unit 33 is configured to drive the main spindle 31 in the C1-axis direction and move the main spindle 31 in the Z1 direction under control of the NC apparatus 70. The sub spindle driving unit 34 is configured to drive the sub spindle 32 in the C2-axis direction and move the sub spindle 32 in the X2 direction and the Z2 direction under control of the NC apparatus 70.

The NC lathe 1 includes the operation control means U1 for controlling the operation of the tool unit TU1 in accordance with a plurality of commands described in the NC program. The operation is described below with reference to the pivoting unit TU2 attached to the turret 13 as an example of the tool unit TU1.

FIG. 3 illustrates an example of the pivoting unit. As illustrated in FIG. 3, the pivoting unit TU2 includes the pivoting portion TU2a, a mounting portion TU2b to be attached to the turret 13, a pivoting shaft receiving portion TU2c having the pivoting shaft TU2d inserted therein, a rotation shaft receiving portion TU2e having the rotation shaft TU2f inserted therein, and a plurality of rotary tools T2. The mounting portion TU2b is secured to the turret 13 so as to be unmovable relative to the turret 13. The pivoting shaft receiving portion TU2c is inserted into a pivoting shaft insertion hole (not illustrated) of the turret 13. The pivoting shaft TU2d receives driving force transmitted from a pivoting driving shaft (not illustrated) of the turret 13. The pivoting portion TU2a is driven by rotation of the pivoting shaft TU2d. The rotation shaft receiving portion TU2e is inserted into a rotation shaft insertion hole (not illustrated) of the turret 13. The rotation shaft TU2f receives driving force transmitted from a rotation driving shaft (not illustrated) of the turret 13. The plurality of rotary tools T2 are driven by rotation of the rotation shaft TU2f. Note that in the following description, the pivoting of the pivoting unit TU2 is the same as the pivoting of the pivoting portion TU2a.

In FIG. 4A, as shown by a solid line, the pivoting portion TU2a of the pivoting unit TU2 is in a predetermined position P1 close to the guide bush 40 with the pivoting angle on the B3-axis being at a 0-degree angle (0°). The pivoting unit TU2 is movable in the Z3-axis direction together with the turret 13. In FIG. 4A, as shown by a chain double-dashed line, the pivoting portion TU2a is in a predetermined position P2 where the pivoting portion TU2a does not interfere with the guide bush 40 even if it does a complete three-sixty (360°). As also shown by a chain double-dashed line, the pivoting portion TU2a may turn at a plus 90-degree angle (+90°) and at a minus 90-degree angle (−90°) respectively. In the NC apparatus 70, a minus 90-degree angle (−90°) is internally replaced with a plus 270-degree angle (+270°) by calculation (+360 minus+90).

Figure 4B:
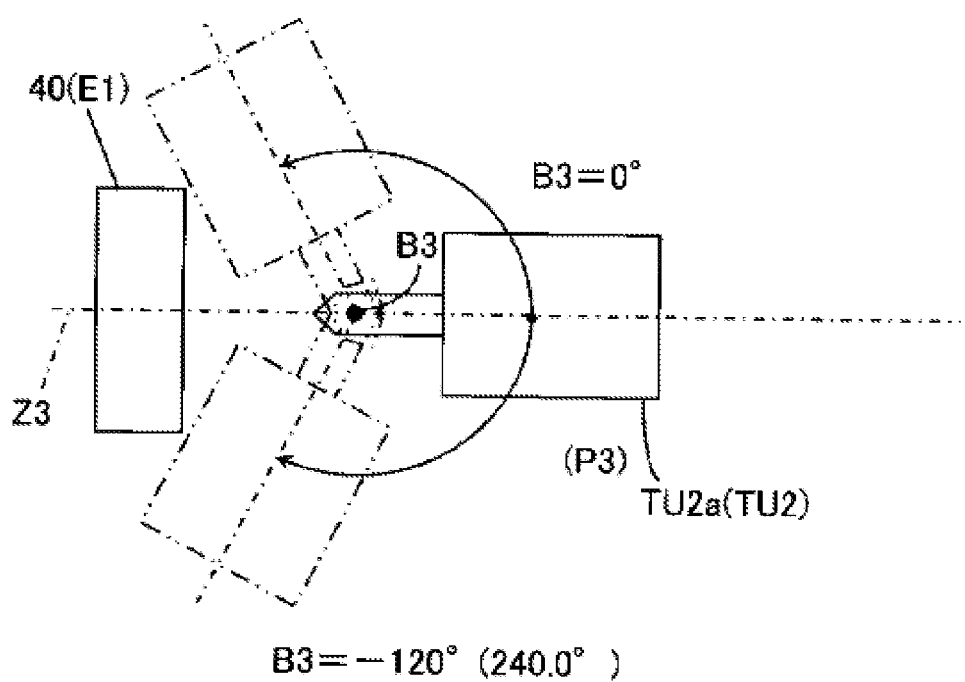

If the pivoting portion TU2a in the position P1 turns beyond a plus 90-degree angle (+90°) or a minus 90-degree angle (−90°), the pivoting portion TU2a would interfere with the guide bush 40. Accordingly, the guide bush 40 corresponds to the machine element E1 located within the movable region of the pivoting unit TU2. By limiting the pivotable range to the angle from a minus 90-degree (−90°) to a plus 90-degree (+90°), interference of the pivoting unit TU2 with the guide bush 40 would not occur as far as the pivoting portion TU2a is in the position P1 and farther. The pivoting portion TU2a, however, is not allowed to turn toward the guide bush to machine the workpiece W1 due to the restriction when the pivoting unit TU2 is in a position P3 that is slightly farther than the position P1 where interference with the guide bush 40 would not occur if the pivoting portion TU2a turns beyond the restriction, the range from a minus 90-degree (−90°) to a plus 90-degree (+90°). In FIG. 4B, as shown by a chain double-dashed line, the pivoting portion TU2a in the position P3 would be pivotable without the restriction at a plus 120-degree angle) (+120°) and a minus 120-degree angle (−120°), which corresponds to +240° internally, to machine the workpiece W1 without interference with the guide bush 40.

If the Z3-axis position of the turret 13 is controlled in units of 0.1 mm, the limit values of the pivoting angle of the pivoting unit TU2 avoiding interference would be finely varied. If the limit values of the pivoting angle are stored in an information table for each of the positions in the Z3-axis, a large amount of memory would be required and thus the cost of the machine tool would be increased. If, alternatively, the 3D interference checking function is provided in the NC apparatus, the cost of the machine tool also would be increased. According to the NC lathe 1, since the NC lathe 1 is a spindle movable type lathe having the guide bush between the main spindle and the sub spindle, the guide bush is not movably configured in the Z-axis direction. In general, when the Z3-axis position of the turret 13 is indexed or determined, the main spindle 31 is moved in the Z1-axis direction to carry the workpiece in the Z-axis direction. In general, the position of the pivoting unit TU2 with respect to the guide bush 40 in the Z-axis direction remain unchanged. In the present invention, as illustrated in FIG. 9, an M168 command (a limit value setting command CM2) is provided to move a workpiece in the Z1-axis direction as needed to allow the pivoting portion TU2a to be pivotably moved to the nearly limit value toward the guide bush to machine the workpiece.

Figure 5A:
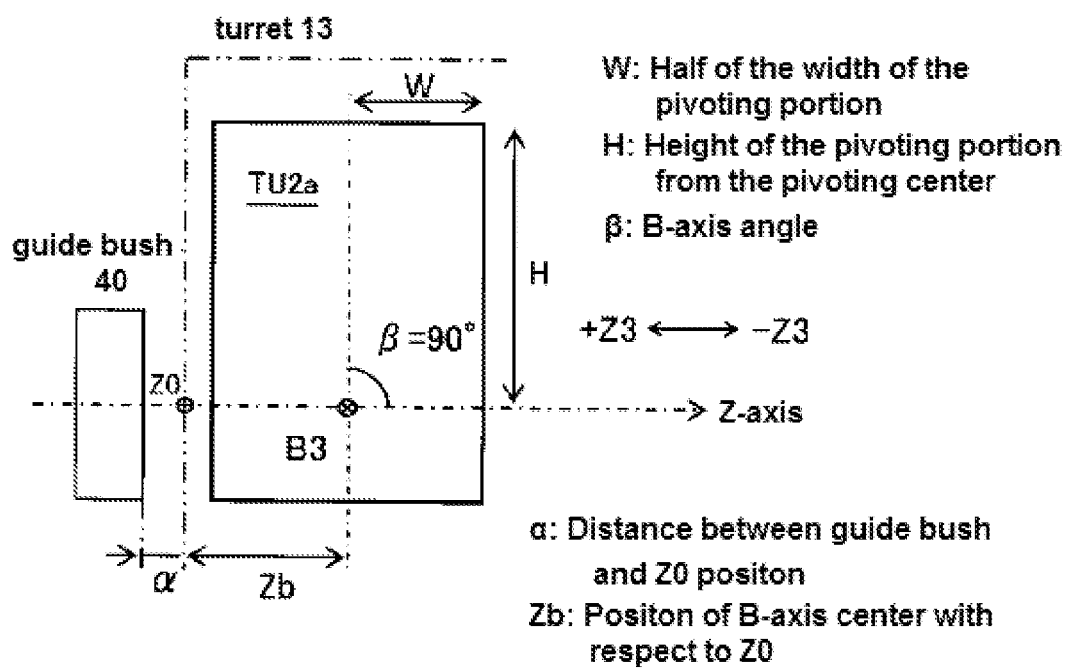
FIG. 5A and FIG. 5B are schematic illustrations of an example to determine a movable region of the pivoting unit.
Figure 5B:
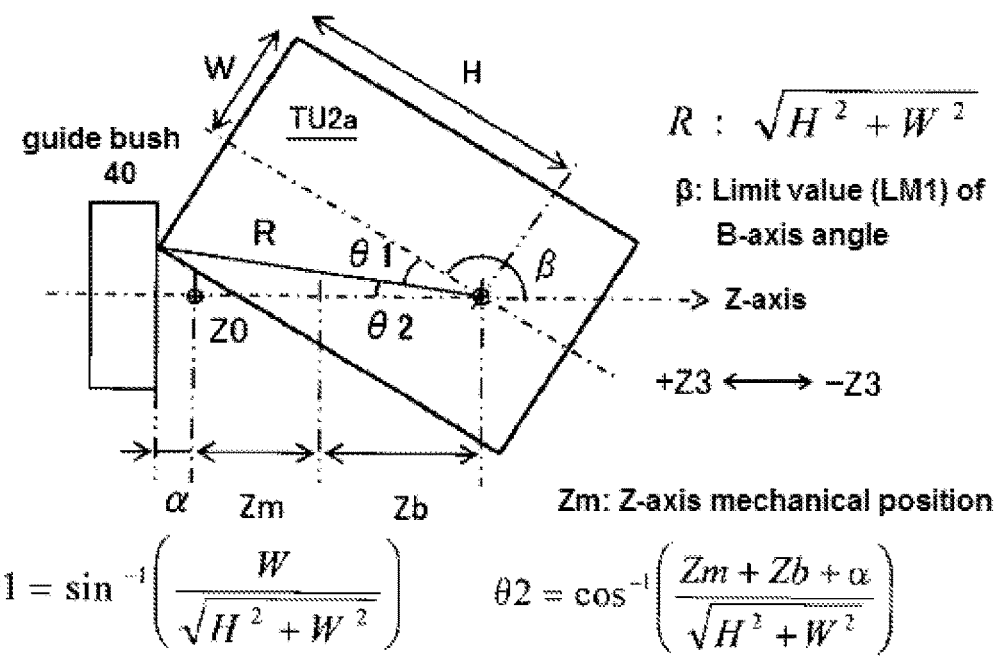

An example of calculation of the limit value LM1 of the pivoting position of the pivoting unit TU2 attached to the turret 13 is described with reference to FIGS. 5A and 5B. In FIGS. 5A and 5B, the pivoting portion TU2a is schematically indicated by a rectangle. The central point on which the pivoting portion TU2a pivots (the pivoting center) is identified by a reference symbol "B3", and a reference position of the turret 13 in the Z-axis direction is identified by a reference symbol "Z0". A length W indicates a half the width of the pivoting portion TU2a, that is, a maximum length from the pivoting center in the Z-axis direction. A height H indicates the maximum length of the pivoting portion TU2a from the pivoting center in a direction perpendicular to the Z-axis and the B3-axis. A B-axis angle β indicates a pivoting angle of 90 degrees (+90°) with respect the Z axis. The length W, the height H, and the pivoting angle are stored in, for example, the RAM 73 as illustrated in FIG. 2. A distance α is a positive value indicating the Z-axis position of the guide bush 40 from the reference position Z0. The distance α is stored in, for example, the ROM 72 as illustrated in FIG. 2. A distance Zb is a positive value indicating the Z-axis position of the pivoting center from the reference position Z0. The distance Zb is stored in, for example, the RAM 73 as illustrated in FIG. 2.

The maximum pivoting angle β of the pivoting portion TU2a is being calculated when the turret 13 in the reference position Z0 is moved to the minus Z3 side by a distance Zm as shown in FIG. 5B. The distance Zm is a positive value corresponding to a Z-axis mechanical position of the turret 13 from the reference position Z0. The distance Zm is stored in, for example, the RAM 73. A pivoting radius R of the pivoting portion TU2a, that is, a distance from the pivoting center to the farthest point of the pivoting portion TU2a is expressed as $\sqrt{H^2+W^2}$. Let the angle θ1 be an angle formed by a line indicating the pivoting radius R and a line indicating the height H, and let the angle θ2 be an angle formed by the line indicating the pivoting radius R and the Z axis. Then, the angles θ1 and θ2 are given as follows:

$$\theta1 = A\ SIN(W/\sqrt{(H^2+W^2)}) \quad (1), \text{ and}$$

$$\theta2 = A\ COS((Zm+Zb+\alpha)/\sqrt{(H^2+W^2)}) \quad (2),$$

where "A SIN" represents the inverse trigonometric function for obtaining arc sine, "A COS" represents the inverse trigonometric function for obtaining arc cosine, and "√" represents a function for obtaining the root. In the nature of the function, the argument $W/\sqrt{(H^2+W^2)}$ of the arc sine in equation (1) is greater than 0 and less than 1. Since equation (2) is based on the assumption of interference between the guide bush 40 and the pivoting unit TU2, equation (2) is used if the following condition is met:

$$(Zm+Zb+\alpha)/\sqrt{(H^2+W^2)} < 1 \quad (3).$$

The maximum pivoting angle β on the B3-axis, which is greater than or equal to a plus 90-degree and less than a plus 180-degree (90°≤β<180°), can be given using equations (1) and (2) as follows:

$$\beta = 180 - \theta1 - \theta2 \quad (4)$$
$$= 180 - ASIN(W/\sqrt{(H^2+W^2)}) -$$
$$ACOS((Zm+Zb+\alpha)/\sqrt{(H^2+W^2)}).$$

The maximum angle β is obtained on the basis of the Z-axis mechanical position Zm of the turret 13 that moves relative to the guide bush 40. If the Z-axis mechanical position Zm is small, the maximum angle β is small. If the Z-axis mechanical position Zm is large, the maximum angle β is large within a range in which inequation (3) is satisfied. Upon reading the M168 command out of the NC program, the NC lathe 1 calculates the maximum angle β(β>0) using equation (4) and determines the no-entry region of the pivoting unit TU2.

Figure 6A:
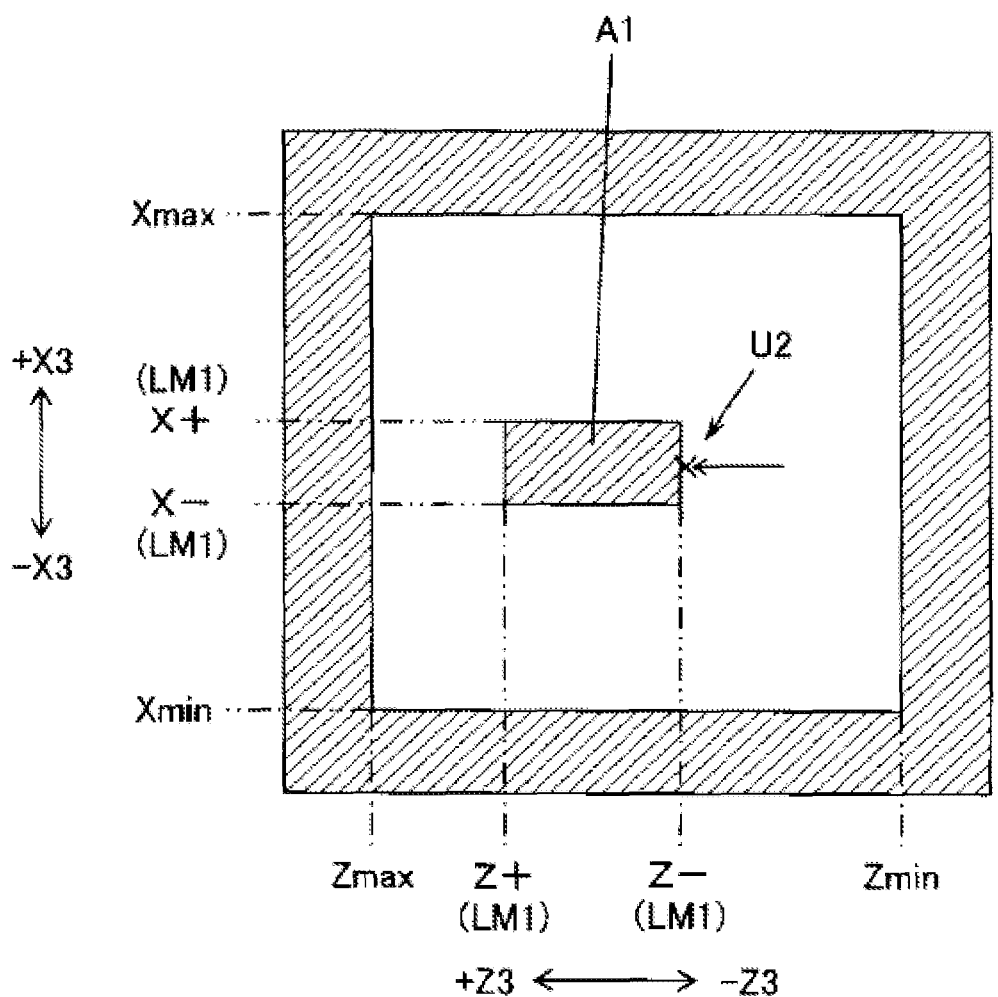
FIGS. 6A to 6C are schematic illustrations of an example of a stroke limiting function.
Figure 6B:
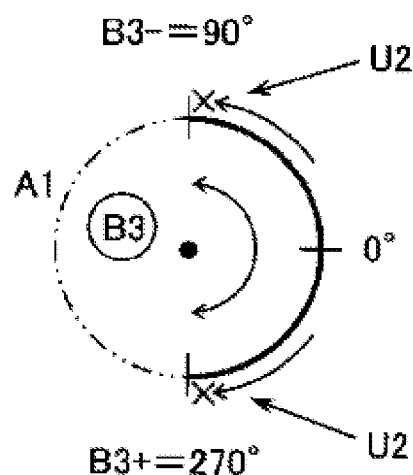
Figure 6C:
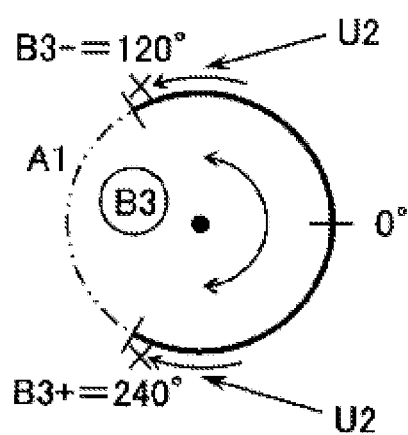

FIGS. 6A to 6C schematically illustrate an example of a stroke limiting function (movement restricting function) of the movement restricting means U2. More specifically, FIG. 6A illustrates an example in which a stroke limit of the tool post is set in the Z3-axis and the X3-axis directions. In FIGS. 6A to 6C, "Zmin", "Zmax", "Xmin", and "Xmax" indicate limit positions of movement of the tool post set by the mechanical restriction. The "Zmin" indicates the limit position of movement in the minus Z3 (−Z3) direction. The "Zmax" indicates the limit position of movement in the plus Z3 (+Z3) direction. The "Xmin" indicates the limit position of movement in the minus X3 (−X3) direction. The "Xmax" indicates the limit position of movement in the plus X3

(+X3) direction. The area with hatchings outside a rectangle formed by the limit positions ("Zmin", "Zmax", "Xmin", "Xmax") indicates a no-entry region set by the mechanical restriction. The limit values ("Z−", "Z+", "X−", "X+") of the position of the tool post correspond to the limit values LM1 of the present technology. The limit values ("Z−", "Z+", "X−", "X+") are stored in the RAM 73 within the range of the limit positions ("Zmin", "Zmax", "Xmin", Xmax") so that the following relationships are established: "Zmax">"Z+">"Z−">"Zmin" and "Xmax">"X+">"X−">"Xmin". Due to the stroke limiting function, the position (Z, x) of the tool post including the tool unit is controlled not to fall within the no-entry region A1 determined by the limit values ("Z−", "Z+", "X−", "X+") so that the following relationships are never established: "Z−"≤z≤"Z+" and "X−"≤x≤"X+".

If the stroke limiting function is applied to the pivoting position of the pivoting unit TU2, the maximum angle β(β>0) obtained using the equation (4) is directly set as the limit value "B3−" and (360−β) is set as the limit value "B3+". Thus, the limit values ("B3−", "B3+") stored in the RAM 73 vary depending on the Z3-axis position of the turret 13. For example, if the maximum angle β equals a 90-degree (90°), the limit value "B3−" would be a 90-degree angle (+90°) and the limit value "B3+" would be a 270-degree angle)(+270°). Accordingly, as illustrated in FIG. 6B, the pivoting portion TU2a is controlled not to enter the no-entry region of a 90-degree angle (+90°) to a 270-degree angle (+270°). If the maximum angle β equals a 120-degree (120°), the limit value "B3−" would be a 120-degree angle (+120°) and the limit value "B3+" would be a 240-degree angle (+240°). Accordingly, as illustrated in FIG. 6C, the pivoting portion TU2a is controlled not to enter a no-entry region of a 120-degree angle (+120°) to a 240-degree angle (+240°).

Note that since the NC lathe 1 controls the movement of the plurality of spindles 30, the guide bush 40, and the plurality of the tool posts 10, movement control is divided to a plurality of control paths. FIG. 7 is a schematic illustration of an example of the configurations of an M131 command and an M133 command for designating a command target to be controlled in each of the control paths. FIG. 8 is a schematic illustration of an example of the paths set by the M131 command and the M133 command. In this case, the M133 command is the spindle designating command CM3 for designating the main spindle 31 as a command target for movement in the Z-axis direction in the path 3 including the turret 13. The M131 command is the spindle designation cancel command CM4 for cancelling the designation made by the M133 command.

If the M131 command illustrated in FIG. 7 is read, the NC lathe enters an M131 mode enclosed by a chain double-dashed line in FIG. 8. In the M131 mode, a command for each axis in each path has the following meaning.
[Path 1]
X Command: causing movement of the gang tool post 11 in the X1-axis direction
Y command: causing movement of the gang tool post 11 in the Y1-axis direction
Z command: causing movement of the main spindle 31 in the Z1-axis direction
C Command: causing rotation of the main spindle 31 in the C1-axis direction on the rotation axis AX1
[Path 2]
X Command: causing movement of the sub spindle 32 in the X2 -axis direction
Y Command: causing movement of the backworking tool post 12 in the Y2-axis direction
Z Command: causing movement of the sub spindle 32 in the Z2-axis direction
C Command: causing rotation of the sub spindle 32 in the C2 -axis direction on the rotation axis AX2
[Path 3]
X Command: causing movement of the turret 13 in the X3-axis direction
Y Command: causing movement of the turret 13 in the Y3-axis direction
Z Command: causing movement of the turret 13 in the Z3-axis direction
C Command: invalid If the M133 command illustrated in FIG. 7 is read, the NC lathe enters an M133 mode enclosed by a solid line in FIG. 8. In the M133 mode, a command for each axis in each path has the following meaning.
[Path 1]
X Command: causing movement of the gang tool post 11 in the X1-axis direction
Y command: causing movement of the gang tool post 11 in the Y1-axis direction
Z command: invalid
C Command: invalid
[Path 2]
X Command: causing movement of the sub spindle 32 in the X2 -axis direction
Y Command: causing movement of the backworking tool post 12 in the Y2-axis direction
Z Command: causing movement of the sub spindle 32 in the Z2-axis direction
C Command: causing rotation of the sub spindle 32 in the C2 -axis direction on the rotation axis AX2
[Path 3]
X Command: causing movement of the turret 13 in the X3-axis direction
Y Command: causing movement of the turret 13 in the Y3-axis direction
Z Command: causing movement of the main spindle 31 in the Z1-axis direction
C Command: causing rotation of the main spindle 31 in the C1-axis direction
Z3 Command: causing movement of the turret 13 in the Z3-axis direction.

As described above, the paths 1 and 3 are changed upon switching the M131 mode and M133 mode though the path 2 is totally unchanged. In the M 131 mode, movement of the main spindle 31 in the Z1-axis direction and the C1-axis direction is controlled in the path 1. In the M133 mode, however, movement of the main spindle 31 in the Z1-axis direction and the C1-axis direction is controlled in the path 3. Thus, in the M133 mode, the Z command is not available for movement of the turret 13 in the Z3-axis direction. That is, in the M133 mode, the target of the Z command in the path 3 is the main spindle 31 while in the M131 mode, the target of the Z command in the path 3 is not the main spindle 31 since the designation by the M133 mode is canceled. Note that in the above-described example, the turret 13 can be moved in the Z3 axis direction by using a special command called Z3 command. However, according to the present technology, the Z3 command may be eliminated.

FIG. 9 is a schematic illustration of an example of the NC program P2 describing the plurality of commands CM1 for each of the paths. The interpretive program P1 illustrated in FIG. 2 allows the NC apparatus 70 to interpret each of the commands CM1 of the NC program P2 and execute the command (perform functions). Such functions include the operation control function and the movement restricting function. As illustrated in FIG. 9, the NC program P2 for the paths 1 and 3 describes a front machining following a first M131 command and a cut-off following the last M131 command. The NC program for the path 2 (not illustrated) may describe, for example, a backworking and ejection of a part.

In FIG. 9, "x" represents any one of the numbers 0 to 9. For example, "Oxxxx" indicates a program number described at the head of the NC program. "M131" is the spindle designating cancel command CM4 to be described in both paths 1 and 3, which is a wait command that requires waiting between the paths. Following the M131 command, movement of the main spindle 31 in the Z1-axis and the C1-axis is controlled in the path 1. "M3Sxxxx" causes the main spindle 31 to be rotated at a rotational speed of xxxx (rpm). "T1xxx" of the path 1 causes one of the tools of the gang tool post 11 to be selected, and "T3xxx" of the path 3 causes one of the tools of the turret 13 to be selected. "G0" states rapid feed. "G0X40.0Y0.0Z-0.5" of the path 1 causes a rapid feed of the gang tool post 11 to the position 40.0 in the X1 axis and to the position 0.0 in the Y1 axis and causes a rapid feed of the main spindle 31 to the position −0.5 in the Z axis. "G1" states linear interpolation feed. "Z−60.0" of the path 3 causes the turret 13 to be indexed at the position −60.0 in the Z3 axis.

"M133" is the spindle designating command CM3 to be described in both paths 1 and 3, which is a wait command that requires waiting between the paths. Upon reading the M133 command, control of movement of the main spindle 31 in the Z1-axis the C1-axis is changed from the path 1 to the path 3. Thus, the turret 13 and the pivoting unit TU2 are not allowed to move in the Z3-axis direction by the command in the path 3. The no-entry region A1 is determined by the limit values LM1 of the pivoting position of the pivoting unit TU2 and appropriately maintained until the limit values LM1 are reset.

"M168" described in the path 3 is the limit value setting command CM2 for calculating the limit values LM1 of the position of the pivoting unit TU2 avoiding interference with the guide bush 40 (the machine element E1) and for determining the no-entry region A1 by the calculated limit values. The M168 command is only used in the M133 mode since it allows the pivoting unit TU2 to turn to the nearly limit value without interference with the guide bush 40. If the M168 command is detected in the M131 mode, an alarm is triggered and the operation of the NC lathe 1 stops. "B120.0" causes the pivoting unit TU2 of the turret 13 to be set at the pivoting position of 120.0 in the B3-axis. "M99" causes a sub-program to end. Note that if a tool selection command "T3xxx" is read out in the path 3, the no-entry region A1 of the pivoting portion TU2a is initialized to the default values (B3−=90°, B3+=270°).

The operation performed by the NC lathe 1 is described below with reference to FIG. 10. FIG. 10 illustrates an example of machining performed when the M168 command is executed by the NC apparatus 70. The M168 command processing is performed through the operation control function that is provided by the interpretive program P1 executed by a computer (the NC apparatus 70). Accordingly, the NC apparatus 70 that performs the M168 command processing constitutes the operation control means U1 together with the variety of driving units 14 to 16 and driving units 21, 23 to 26, 33, and 34.

Upon reading the M168 command (the limit value setting command CM2), the NC apparatus 70 determines whether the M168 command is read out in the M133 mode (step S102, hereinafter "step" is removed). If "M168" illustrated in FIG. 9 is described prior to "M133", the M168 command is determined to be read out in the M131 mode. In such a case, the NC apparatus 70 outputs an alarm from an output unit such as the display unit 82, and stops the operations of the driving units (S104). Thereafter, the NC apparatus 70 terminates the M168 command processing. Accordingly, the movement of the pivoting unit TU2 is restricted. In the M131 mode, the turret 13 and the pivoting unit TU2 is allowed to be moved in the Z3-axis direction by a command in the path 3. If the pivoting unit TU2 is moved in the Z3 axis direction and thus closer to the guide bush 40, interference with the guide bush 40 would occur. Accordingly, by restricting the movement of the pivoting unit TU2, interference with the guide bush 40 is prevented.

The following description is made with reference to FIG. 5 in addition to FIG. 10. As illustrated in FIG. 9, if the M168 command is read out in the M133 mode, control of movement of the turret 13 and the pivoting unit TU2 in the Z3-axis direction is not allowed by a command of the path 3. The no-entry region A1 is determined by the limit values LM1 of the pivoting position of the pivoting unit TU2 and appropriately maintained until the limit values LM1 are reset. In such a case, the NC apparatus 70 obtains the Z-axis mechanical position Zm of the turret 13 (Zm>0) and the Z-axis position α of the guide bush 40 (α>0) from, for example, the RAM 73 or the ROM 72 (S106). In S108, the NC apparatus 70 obtains data of the pivoting unit from, for example, the RAM 73 including half the width W of the pivoting portion TU2a, the height H of the pivoting portion TU2a, and the Z-axis position Zb of the B3-axis pivoting center. In S110, it is determined whether the argument(($(Zm+Zb+α)/\sqrt{(H^2+W^2)}$)) of arc sine in the equation (2) for calculating the angle θ2 is greater than or equal to 1. If the argument is greater than or equal to 1, the angle θ2 cannot be obtained by using the equation (2). However, the interference between the guide bush 40 and the pivoting unit TU2 would not occur. Accordingly, if the condition is met, the NC apparatus 70 cancels the setting of the no-entry region of the pivoting unit TU2 (S116) and finishes the M168 command processing. In this case, the pivoting unit TU2 is rotatable three-sixty (360°) on the B3 axis.

However, if, in step S110, the condition is not met, the NC apparatus 70 calculates the maximum pivoting angle β on the B3 axis using the equation (4) (S112). Finally, the NC apparatus 70 determines the limit values ("B3−", "B3+") of the pivoting position of the pivoting unit TU2 avoiding interference with the guide bush 40 and stores the limit values ("B3−", "B3+") in the RAM 73 (S114). Thereafter, the NC apparatus 70 completes the M168 command processing. Storing the limit values ("B3−", "B3+") in the RAM 73 corresponds to determining the no-entry region A1 based on the calculated limit values ("B3−", "B3+"). In this manner, when the M168 command is read out of the NC program P2 in the M133 mode, the limit values ("B3−", "B3+") are calculated to determine the no-entry region A1. The limit values ("B3−", "B3+") are calculated on the basis of the Z-axis mechanical position Zm of the turret 13 movable relative to the guide bush 40. The limit value "B3−" would decrease with the decrease in the Z-axis mechanical position Zm. The limit value "B3−" would increase with the increase in the Z-axis mechanical position Zm within the range of $((Zm+Zb+α)/\sqrt{(H^2+W^2)})<1$.

For example, if the turret 13 is brought in the Z3-axis direction close to the guide bush 40 and thus the angle β equals to 90 degrees (90°), the "B3−" is set at a 90-degree angle (+90°) and the "B3+" is set at a 270-degree angle (270°) as illustrated in FIG. 6B. In this case, the movement restricting means U2 of the NC apparatus 70 reads out the limit values, 90-degree angle)(+90° and 270-degree angle (270°), from the RAM 73 and inhibits entry of the pivoting unit TU2 into the no-entry region (from 90° to 270°) determined by the limit values. Then, if the turret 13 is moved away from the guide bush 40 in the Z3 axis direction and thus, the angle β equals 120 degrees (120°), the "_B3-" is set at a 120-degree angle (+120°) and the "B3+" is set at a 240-degree angle (+240°) as illustrated in FIG. 6C. Entry of the pivoting unit TU2 into the no-entry region (from 120° to 240°) determined by the limit values is inhibited by the movement restricting means U2 of the NC apparatus 70. Note that in the M131 mode in which the target of the Z command in the path 3 is not the main spindle 31, the movement of the pivoting unit TU2 is restricted by an alarm.

As described above, the no-entry region is determined by the calculated values corresponding to, for example, the position of the tool post not by the information table. In addition, a costly 3D interference checking function required for determining the no-entry region can be eliminated. Thus, according to the present technology, the tool unit can be moved to the nearly limit position without interference with another machine element even when costly interference checking is not performed.

(3) MODIFICATIONS

The present invention can provide a variety of modifications. For example, a machine tool that executes the NC program may be a numerical control machine tool other than a NC lathe. The sequence of the above-described steps may be changed as needed. For example, acquisition of the Z-axis mechanical position Zm of the turret and the Z-axis position α of the guide bush performed in S106 may be performed after the process in S108.

Figure 11:
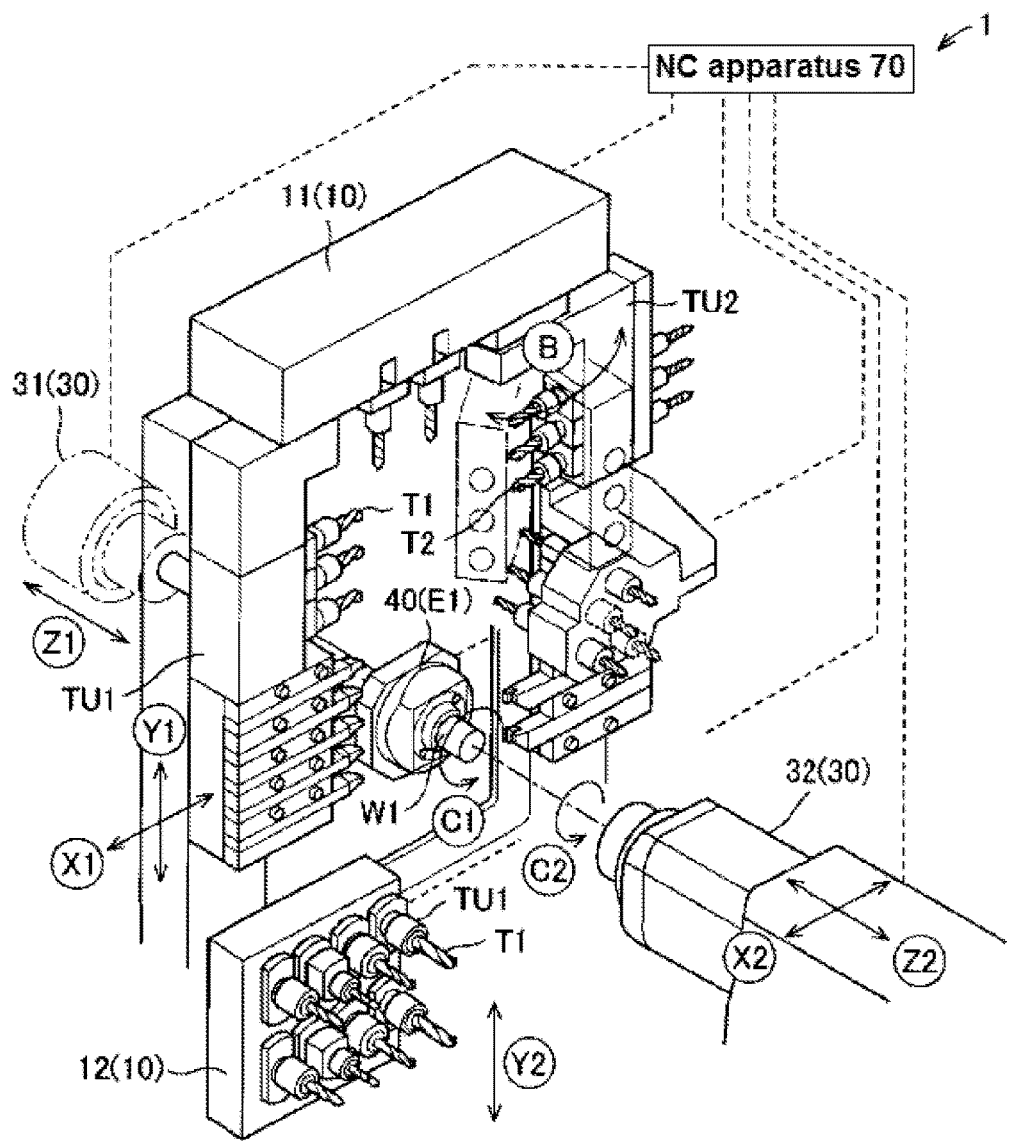
FIG. 11 is a schematic illustration of a machine tool according to a modification.

The tool post according to the present technology may be the gang tool post or a backworking tool post in addition to the turret. FIG. 11 is a schematic illustration of an NC lathe 1 (a machine tool) according to a modification. The NC lathe 1 includes the plurality of main spindles 30 (the main spindle 31 and the sub spindle 32), the guide bush 40, the plurality of tool posts 10 (the gang tool post 11, the backworking tool post 12), and the NC apparatus 70. According to the present modification, the gang tool post 11 is movable in the X1-axis direction and the Y1-axis direction. The gang tool post 11 has the pivoting unit TU2 attached thereto. The pivoting unit TU2 has the tool T2 (e.g., a rotary tool) mounted thereon. The pivoting portion of the pivoting unit TU2 is configured to be rotatable relative to the gang tool post 11 on a predetermined rotation axis that extends along the Y1-axis. Note that in FIG. 11, a control axis of pivoting is referred to as a "B axis". Movement of the gang tool post 11 and the pivoting portion of the pivoting unit TU2 can be controlled by constituent elements having the same configurations as the NC apparatus 70, the gang tool post driving unit 14, and the unit pivoting driving unit 21 as illustrated in FIG. 2.

When the front of a workpiece W1 is to be machined using the tool T2 of the pivoting unit TU2 attached to the gang tool post 11, the limit values of the pivoting position of the pivoting unit TU2 avoiding interference with the guide bush 40 may vary depending on the X1-axis position of the gang tool post 11. Accordingly, the NC apparatus 70 may calculate the limit values of the position of the pivoting unit TU2 on the basis of the X1-axis position of the gang tool post 11 using, for example, an inverse trigonometric function and set the no-entry region by the calculated limit values.

Another machine element E1 according to the present technology may be, for example, the spindle 30 instead of the guide bush 40. For example, when a back machining is performed on a workpiece chucked by the sub spindle 32 that does not move in the Z2-axis direction using the tool T2 of the pivoting unit TU2 of the turret 13, the limit values of the position of the pivoting unit TU2 avoiding interference with the sub spindle 32 may vary depending on the Z3-axis position of the turret 13. Accordingly, the NC apparatus 70 may calculate the limit values of the position of the pivoting unit TU2 on the basis of the Z3-axis position of the turret 13 using, for example, an inverse trigonometric function and set the no-entry region by the calculated limit values.

Note that even when the NC program does not include a spindle designating command and a spindle designation cancel command, the effect to allow the tool unit to move to the nearly limit value without costly interference checking can be provided.

(4) CONCLUSION

As described above, according to the present invention, a technology can be provided that allows the tool unit to move to the nearly limit value without interference with another machine element even when costly interference checking is not performed. At that time, even a technology using components according to the independent claims without component according to dependent claims can proved the basic operations and the effect. In addition, a configuration obtained by exchanging the configurations described in the above-described embodiment and modification with one another or changing the combination of configurations and a configuration obtained by exchanging existing configurations and the configurations described in the above-described embodiment and modification with one another or changing the combination of configurations can be made. The present invention encompasses the above-described configurations.

What is claimed is:
1. A machine tool comprising:
   a tool post having a tool unit for machining a workpiece;
   a spindle which is movable in an axis direction thereof and releasably chucks the workpiece inserted in the axis direction;
   operation control means for controlling an operation of the tool unit in accordance with a plurality of commands described in a numerical control program; and
   movement restricting means for inhibiting entry of the tool unit into a no-entry region;
   wherein at least part of the tool unit is pivotably attached to the tool post,
   wherein the plurality of commands include a limit value setting command for calculating a limit value of a pivoting angle of the tool unit avoiding interference with a machine element located within a movable region of the tool unit on the basis of a current position of the tool post and a current position of the machine element and for determining the no-entry region by the calculated limit value,
   wherein upon reading the limit value setting command out of the numerical control program, the operation control means calculates the limit value on the basis of the position of the tool post and the position of the machine element and determines the no-entry region by the calculated limit value, and wherein the movement restricting means inhibits entry of the tool unit into the determined no-entry region until another limit value setting command is read, wherein the tool post is movably provided relative to the machine element, wherein the machine element comprises a guide bush which slidably supports the workpiece chucked by the spindle in the axis direction, wherein upon reading the limit value setting command out of the numerical control program, the operation control means calculates the limit value on the basis of the position of the tool post, the position of the guide bush, a width of a pivoting part of the tool unit, a height of the pivoting part of the tool unit, and a position of a pivoting center of the pivoting part of the tool unit, and wherein the limit value of a pivoting angle of the tool unit is calculated by the following equation:

$$\beta = 180 - A\ SIN(W/\sqrt{(H^2+W^2)}) - A\ COS((Zm+Zb+\alpha)/\sqrt{(H^2+W^2)}),$$

where "$\beta$" is the limit value of the pivoting angle, "A SIN" represents the inverse trigonometric function for obtaining arc sine, "A COS" represents the inverse trigonometric function for obtaining arc cosine, "$\sqrt{}$" represents a function for obtaining the root, "W" represents a half width of the pivoting part, "H" represents a height of the pivoting part measured from a pivoting center of the pivoting part, "Zm" represents a moved distance of the tool post from a reference position Z0, "Zb" represents a distance between the reference position Z0 and the pivoting center of the pivoting part when the tool post is at the reference position Z0, and "$\alpha$" represents a distance between the reference position Z0 and the position of the guide bush.

2. The machine tool according to claim 1, wherein the plurality of commands include a tool selection command, wherein upon reading the tool selection command out of the numerical control program, the operation control means selects the tool unit and initializes the no-entry region to a default, and wherein the movement restricting means inhibits entry of the tool unit into the no-entry region until another limit value setting command or another tool selection command is read.

3. The machine tool according to claim 1, wherein the plurality of commands include a spindle designating command for designating the spindle as a command target for movement in the axis direction in a predetermined path and a cancel command for cancelling the designation made by the spindle designating command;

wherein upon reading the limit value setting command out of the numerical control program, the operation control means calculates the limit value and determines the no-entry region by the calculated limit value when the spindle is designated by the spindle designating command; and wherein upon reading the limit value setting command out of the numerical control program, the operation control means restricts movement of the tool unit when the designation made by the spindle designating command is cancelled by the cancel command.

4. A non-transitory computer readable medium storing an interpretive program for use in a machine tool comprising a tool post having a tool unit for machining a workpiece and a spindle which is movable in an axis direction thereof and releasably chucks the workpiece inserted in the axis direction, causing a computer to execute an operation control function for controlling an operation of the tool unit in accordance with a plurality of commands described in a numerical control program and to execute a movement restricting function for inhibiting entry of the tool unit into a no-entry region;

wherein at least part of the tool unit is pivotably attached to the tool post, wherein the plurality of commands include a limit value setting command for calculating a limit value of a pivoting angle of the tool unit avoiding interference with a machine element located within a movable region of the tool unit on the basis of a current position of the tool post and a current position of the machine element and for determining the no-entry region by the calculated limit value, wherein upon reading the limit value setting command out of the numerical control program, the limit value is calculated on the basis of the position of the tool post and the position of the machine element and the no-entry region is determined by the calculated limit value, and wherein entry of the tool unit into the determined no-entry region is inhibited until another limit value setting command is read, wherein the tool post is movably provided relative to the machine element, wherein the machine element comprises a guide bush which slidably supports the workpiece chucked by the spindle in the axis direction, wherein upon reading the limit value setting command out of the numerical control program, the operation control means calculates the limit value on the basis of the position of the tool post, the position of the guide bush, a width of a pivoting part of the tool unit, a height of the pivoting part of the tool unit, and a position of a pivoting center of the pivoting part of the tool unit, and wherein the limit value of a pivoting angle of the tool unit is calculated by the following equation:

$$\beta = 180 - A\ SIN(W/\sqrt{(H^2+W^2)}) - A\ COS((Zm+Zb+\alpha)/\sqrt{(H^2+W^2)}),$$

where "$\beta$" is the limit value of the pivoting angle, "A SIN" represents the inverse trigonometric function for obtaining arc sine, "A COS" represents the inverse trigonometric function for obtaining arc cosine, "$\sqrt{}$" represents a function for obtaining the root, "W" represents a half width of the pivoting part, "H" represents a height of the pivoting part measured from a pivoting center of the pivoting part, "Zm" represents a moved distance of the tool post from a reference position Z0, "Zb" represents a distance between the reference position Z0 and the pivoting center of the pivoting part when the tool post is at the reference position Z0, and "$\alpha$" represents a distance between the reference position Z0 and the position of the guide bush.

\* \* \* \* \*